(12) United States Patent  (10) Patent No.: US 8,579,713 B2
Grimmer  (45) Date of Patent: Nov. 12, 2013

(54) TORSIONAL DAMPER ASSEMBLY (75) Inventor: Michael J. Grimmer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/336,905

(22) Filed: Dec. 23, 2011

(65) Prior Publication Data

US 2013/0165240 A1    Jun. 27, 2013

(51) Int. Cl.
*F16F 15/121*    (2006.01)
(52) U.S. Cl.
USPC ........................................... 464/68.2
(58) Field of Classification Search
USPC ...................... 464/3, 68.2; 192/201
See application file for complete search history.

(56) References Cited

U.S. PATENT DOCUMENTS

| | | | |
|---|---|---|---|
| 3,059,740 A | 10/1962 | Roche | |
| 3,296,887 A | 1/1967 | Larsen | |
| 3,612,237 A | 10/1971 | Honda | |
| 3,834,503 A | 9/1974 | Maurer et al. | |
| 4,205,739 A | 6/1980 | Shelby et al. | |
| 4,240,532 A | 12/1980 | Blomquist | |
| 4,270,647 A | 6/1981 | Leber | |
| 4,289,048 A | 9/1981 | Mikel et al. | |
| 4,295,348 A | 10/1981 | Helfer et al. | |
| 4,372,434 A | 2/1983 | Aschauer | |
| 4,412,606 A | 11/1983 | Loizeau | |
| 4,437,551 A | 3/1984 | Gimmler et al. | |
| 4,638,684 A | 1/1987 | Maucher | |
| 4,638,897 A | 1/1987 | Nishimura | |
| 4,646,886 A | 3/1987 | Nishimura | |
| 4,667,798 A | 5/1987 | Sailer et al. | |
| 4,748,868 A * | 6/1988 | Kobayashi et al. | 192/201 X |
| 4,813,295 A | 3/1989 | Drexl et al. | |
| 4,827,784 A | 5/1989 | Muller et al. | |
| 4,846,323 A * | 7/1989 | Fukushima | 464/68.2 X |
| 5,816,924 A * | 10/1998 | Kajitani et al. | 464/68.2 |
| 6,854,580 B2 | 2/2005 | Braford, Jr. | |

FOREIGN PATENT DOCUMENTS

DE    3643272 A1    6/1988

* cited by examiner

*Primary Examiner* — Gregory Binda (57) ABSTRACT

A torsional damper assembly for transmitting torque between a prime mover of a powertrain and an input of a transmission is provided. The torsional damper assembly includes an input mass, an output mass, a damping element, a bypass clutch, and a bypass clutch release lever. The damping element is interposed between the input mass and the output mass, and it is operable to translate torque between the masses and to dampen oscillation generated by the prime mover. The bypass clutch is configured to couple the input and output masses together for common rotation when engaged. The bypass clutch release lever is pivotally rotatable with respect to the output mass, and it includes a biasing portion and a weighted end. When rotated, the biasing portion is operable to bias the bypass clutch away from the input mass to disengage the bypass clutch.

20 Claims, 4 Drawing Sheets

TORSIONAL DAMPER ASSEMBLY

FIELD

The present disclosure relates to damping for a motor vehicle powertrain. More specifically, the disclosure relates to a torsional damping assembly including a damping element and a bypass clutch.

BACKGROUND

The statements in this section merely provide background information related to the present disclosure and may not constitute prior art.

Conventional vehicle powertrains translate torque and speed from a prime mover (for example, an internal combustion engine) to one or more wheels through a transmission. Various torsional damping assemblies have been employed to dampen the vibrations and oscillations generated by the prime mover. For example, some powertrains employ a flywheel between an engine and a clutch. When the clutch is engaged, the flywheel helps to reduce vibrations from propagating from the engine through the powertrain. With increased demand for improved vibration characteristics in vehicles, the single mass flywheel, however, has been inadequate in particular situations, such as, for example, in their use in smaller engines.

As a result, some powertrain arrangements employ a dual mass flywheel with a pair of rotating masses connected to each other with a spring and damper system to reduce the amount of torsional vibrations in the powertrain. A first mass is connected to the engine crankshaft on the engine side of the spring and damper system and a second mass is connected to the clutch side of the spring and damper system. In some powertrains, a drive ring is employed that forms an annular channel having a plurality of coil springs carried in the channel. These spring-mass damper systems, however, may amplify oscillations and pulsations in certain speed ranges. In view of the above, it is apparent there exists a need for a flywheel assembly that further reduces powertrain vibrations.

SUMMARY

In one form, a torsional damper assembly for transmitting torque between a prime mover of a powertrain and an input of a transmission is provided. The torsional damper assembly includes an input mass configured to operatively connect to the prime mover for common rotation therewith and an output mass configured to operatively connect to the input of the transmission for common rotation therewith. A damping element is interposed between the input mass and the output mass. The damping element is operable to translate torque between the input mass and the output mass and to dampen oscillation generated by the prime mover. The damping element is configured to permit the input and output masses to rotate relative to each over a limited angular distance. A bypass clutch is configured to couple the input and output masses together for common rotation when engaged during a first speed range to minimize amplified vibrations and pulsations caused by the prime mover, the damping element, and the input and output masses. A bypass clutch release lever is pivotally connected to the output mass. The bypass clutch release lever has a biasing portion and a weighted end. The bypass clutch release lever is operable to pivotally rotate relative to the output mass, and the biasing portion is operable to bias the bypass clutch away from the input mass to disengage the bypass clutch when the bypass clutch release lever is acted on by a predetermined magnitude of centrifugal force during a second speed range to permit damping by the damping element.

In another form, which may be either combined with or separate from the other forms described herein, a torsional damper assembly for transmitting torque between a prime mover of a powertrain and an input of a transmission is provided. The torsional damper assembly includes an input mass configured to operatively connect to the prime mover for common rotation therewith and an output mass configured to operatively connect to the input of the transmission for common rotation therewith. A plurality of damping elements is interposed between the input mass and the output mass. The damping elements are operable to translate torque between the input mass and the output mass and to dampen oscillation generated by the prime mover. A bypass clutch is configured to couple the input and output masses together for common rotation when engaged during a first speed range to minimize amplified vibrations and pulsations. One or more bypass clutch release levers are provided, each having a biasing portion and a weighted end. The bypass clutch release lever(s) are configured to pivotally rotate relative to the output mass. The biasing portion(s) are operable to bias the bypass clutch away from the input mass to disengage the bypass clutch when the bypass clutch release lever(s) are acted on by a predetermined magnitude of centrifugal force during a second speed range to permit damping by the damping element.

In another form, which may be either combined with or separate from the other forms described herein, a torsional damper assembly for transmitting torque between a prime mover of a powertrain and an input of a transmission is provided. The torsional damper assembly includes input and output masses, coil springs, a bypass clutch, and bypass clutch release levers. The input mass is configured to operatively connect to the prime mover for common rotation therewith. The input mass forms a plurality of cutouts therein. The output mass is configured to operatively connect to the input of the transmission for common rotation therewith. The output mass has a disc and a hub extending from the disc. The disc forms a plurality of cutouts therein, and the hub has a plurality of raised portions separated by a plurality of recesses formed in the hub. The coil springs are interposed between the input mass and the output mass, and the coil springs are disposed within the cutouts of the input mass and the cutouts of the disc of the output mass. The coil springs are operable to translate torque between the input mass and the output mass and to dampen oscillation generated by the prime mover. The rotational movement of either mass relative to the other mass creates a rotational deflection in the coil springs. The bypass clutch is configured to couple the input and output masses together for common rotation when engaged during a first speed range to minimize amplified vibrations and pulsations. The bypass clutch includes clutch springs and a friction plate. The friction plate includes tabs extending therefrom. Each tab extends through one of the hub's recesses to hold the friction plate for common rotation with the output mass. The clutch springs are configured to bias the friction plate against the input mass when the bypass clutch is engaged. The bypass clutch release levers are pivotally connected to the disc of the output mass, and they each have a biasing roller and a weighted end. The clutch springs bias the tabs against the rollers. The bypass clutch release levers are operable to pivotally rotate relative to the output mass, and the rollers are operable to bias the bypass clutch away from the input mass to disengage the bypass clutch when the bypass clutch release levers are acted on by a predetermined magnitude of a centrifugal force during a second speed range to permit damping by the coil springs.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating principles of the invention. Moreover, like reference characters designate corresponding parts throughout the different views. In the drawings.

DETAILED DESCRIPTION

The following description is merely exemplary in nature and is not intended to limit the present disclosure, application, or uses.

Figure 1:
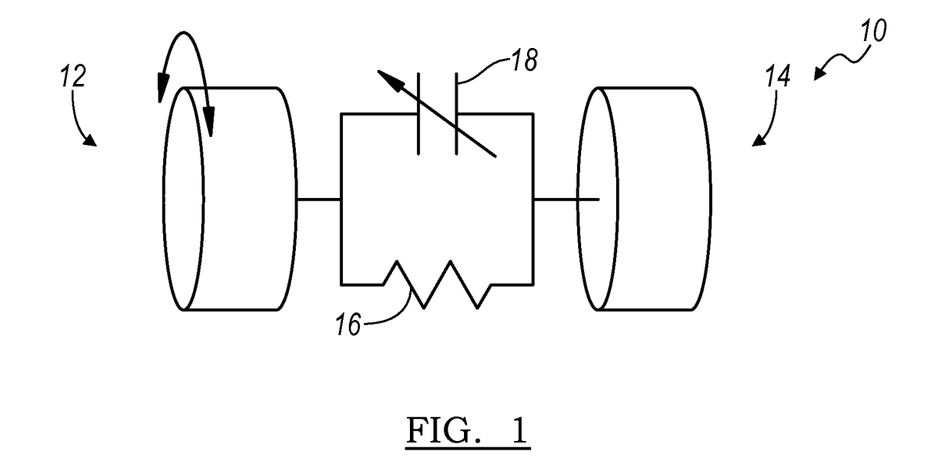
FIG. 1 is a schematic diagram of a torsional damper assembly in accordance with the principles of the present invention.

Referring now to FIG. 1, a torsional damper assembly for transferring torque between a prime mover of a powertrain (such as an engine) and an input of a transmission is illustrated and generally designated at 10. The torsional damper assembly 10 includes an input mass 12 and an output mass 14. The input mass 12 is configured to operatively connect to the prime mover (not shown) for common rotation therewith. The output mass 14 is configured to operatively connect to the input of the transmission (not shown) for common rotation therewith. The input and output masses 12, 14 are coupled together by one or more damping elements such as a plurality of springs schematically represented at reference numeral 16. A damper may also be included in some embodiments, if desired. The springs 16 are arranged to provide limited angular rotation between the input mass 12 and the output mass 14.

A bypass clutch 18 selectively interconnects the input mass 12 with the output mass 14. The bypass clutch 18 is configured to rigidly connect the input and output masses 12, 14 together for common rotation when the bypass clutch 18 is engaged.

When the bypass clutch is disengaged, the input and output masses 12, 14 are coupled by the damping elements (in this embodiment, the springs 16), such that the input and output masses may rotate relative to each other over a limited distance. That is, the two masses 12, 14 are coupled to each other through the springs 16 such that rotational movement between the two masses 12, 14 creates a rotational deflection in the springs 16, which generates a restoring torque between the two masses 12, 14. The springs 16 lower the level of torsional vibrations generated by the firing of the engine in at least certain speed ranges.

Figure 2:
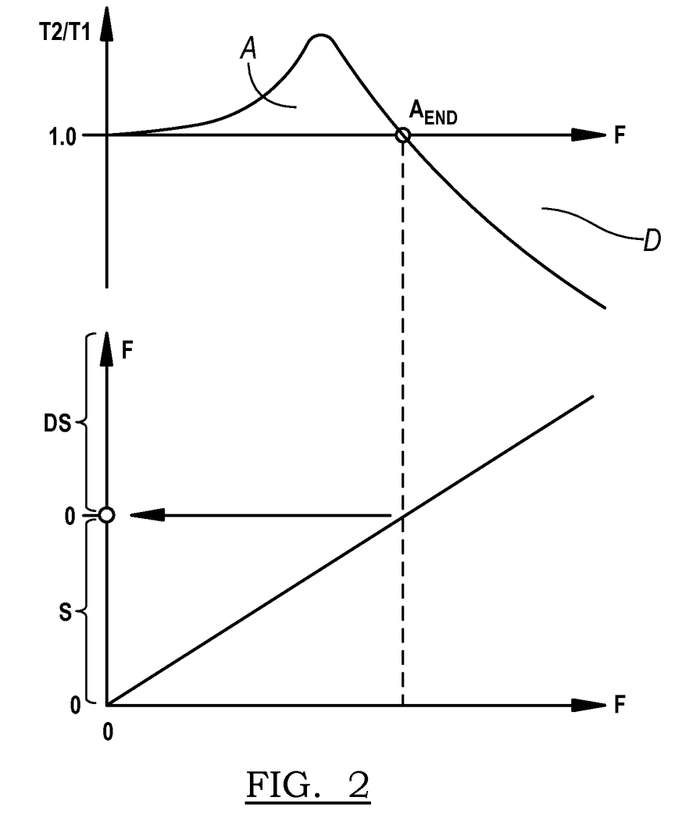
FIG. 2 is a compound graph illustrating oscillations associated with the prime mover and the damper assembly of FIG. 1.

With reference to FIG. 2, a graph is illustrated showing the oscillation torque ratio of the output oscillation torque over the input isolation torque as a function of engine oscillation frequency F. In the upper part of the graph, the ratio of output oscillation torque T2 to input oscillation torque T1 through the damper assembly 10, mathematically stated as T2/T1, is illustrated as a function of engine oscillation frequency F. At resonant frequencies between the engine oscillation frequency and the damper assembly oscillation torque, the oscillation torque ratio T2/T1 will be amplified. The lower part of the graph shows engine oscillation frequency F increasing on both the x and y axes, such that the engine oscillation frequency is shown as a 45 degree increasing line. The engine oscillation frequency generally increases as engine speed (rpm) increases.

Accordingly, at certain engine rpm speeds and when the bypass clutch 18 is disengaged, the oscillation torque output to input ratio T2/T1 will reach a resonance and be amplified. The amplification zone is shown at A on the graph of FIG. 2. Typically, the amplification occurs at lower speeds and may be associated with engine startup. As the engine rpm speed increases beyond the amplification zone A, the damper assembly 10 (with the clutch 18 disengaged) dampens the oscillations such that T2/T1<1. In other words, the oscillation torque T2/T1 is dampened and the damper assembly 10 becomes a desirable feature. In this embodiment, the damping zone D is the region wherein damping occurs and wherein T2<T1, and T2/T1 <1. In the damping zone D, isolation of the input oscillation torque T1 occurs by virtue of the damper element or springs 16.

Since amplification of the torque oscillation is typically undesirable, removal of the amplification zone A may be desired. Therefore, the bypass clutch 18 is engaged in the amplification zone A. Since the bypass clutch 18 locks or pins the input and output masses 12, 14 together for common rotation, the oscillation torque output to input ratio is always equal to one when the bypass clutch 18 is engaged. In other words, T2/T1=1 when the bypass clutch 18 is engaged. The amplification zone A can be removed, then, by keeping the bypass clutch 18 engaged until the end of the amplification zone A at the point $A_{END}$.

Therefore, the torsional damper assembly 10 of the present disclosure may engage the bypass clutch 18 in a startup speed range S. The bypass clutch 18 may then be disengaged, or opened, at an opening speed O that corresponds to the end $A_{END}$ of the amplification zone A. At higher speeds, in the damping speed range DS, the bypass clutch 18 may be disengaged, or open, and the springs 16 and/or other damper elements may dampen the oscillation torque in the damping zone D. The result is that the amplification zone A is eliminated, and the oscillation torque remains free from dampening, but also free from amplification, during the startup engine speed (rpm) range S.

Figure 3:
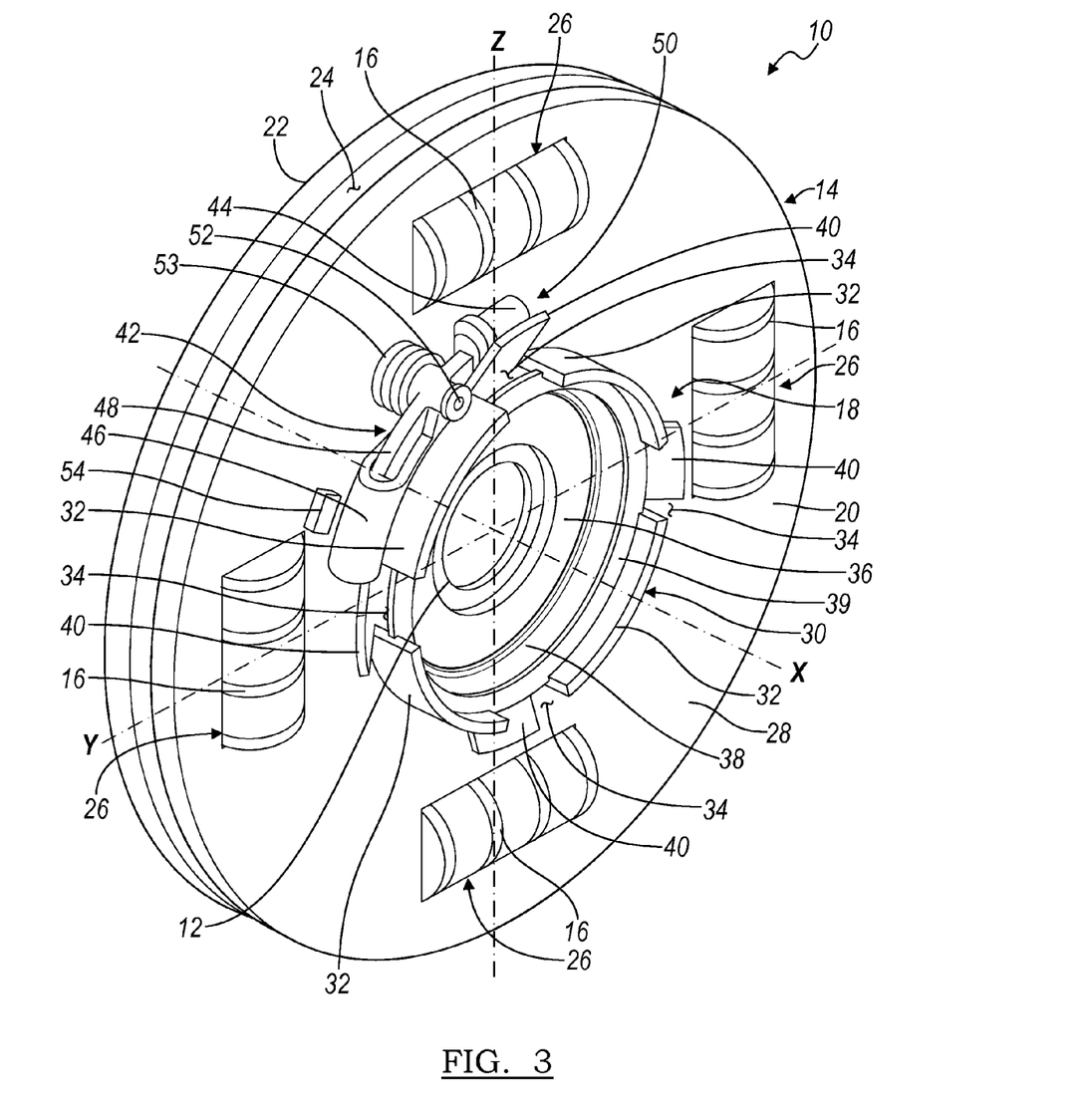
FIG. 3 is a perspective view of an embodiment of the torsional damper assembly of FIG. 1, in accordance with the principles of the present invention.
Figure 4:
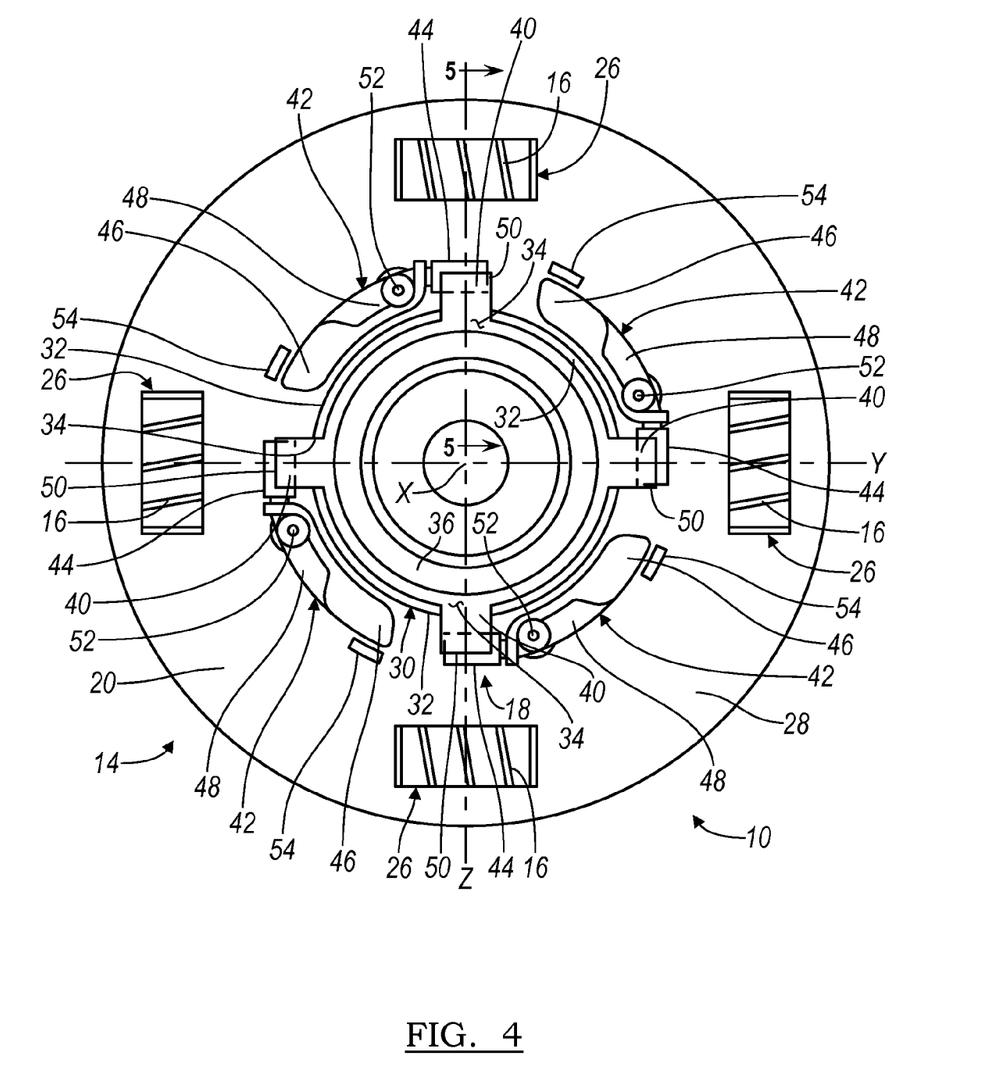
FIG. 4 is a side view of the torsional damper assembly of FIG. 3, in accordance with the principles of the present invention.
Figure 5:
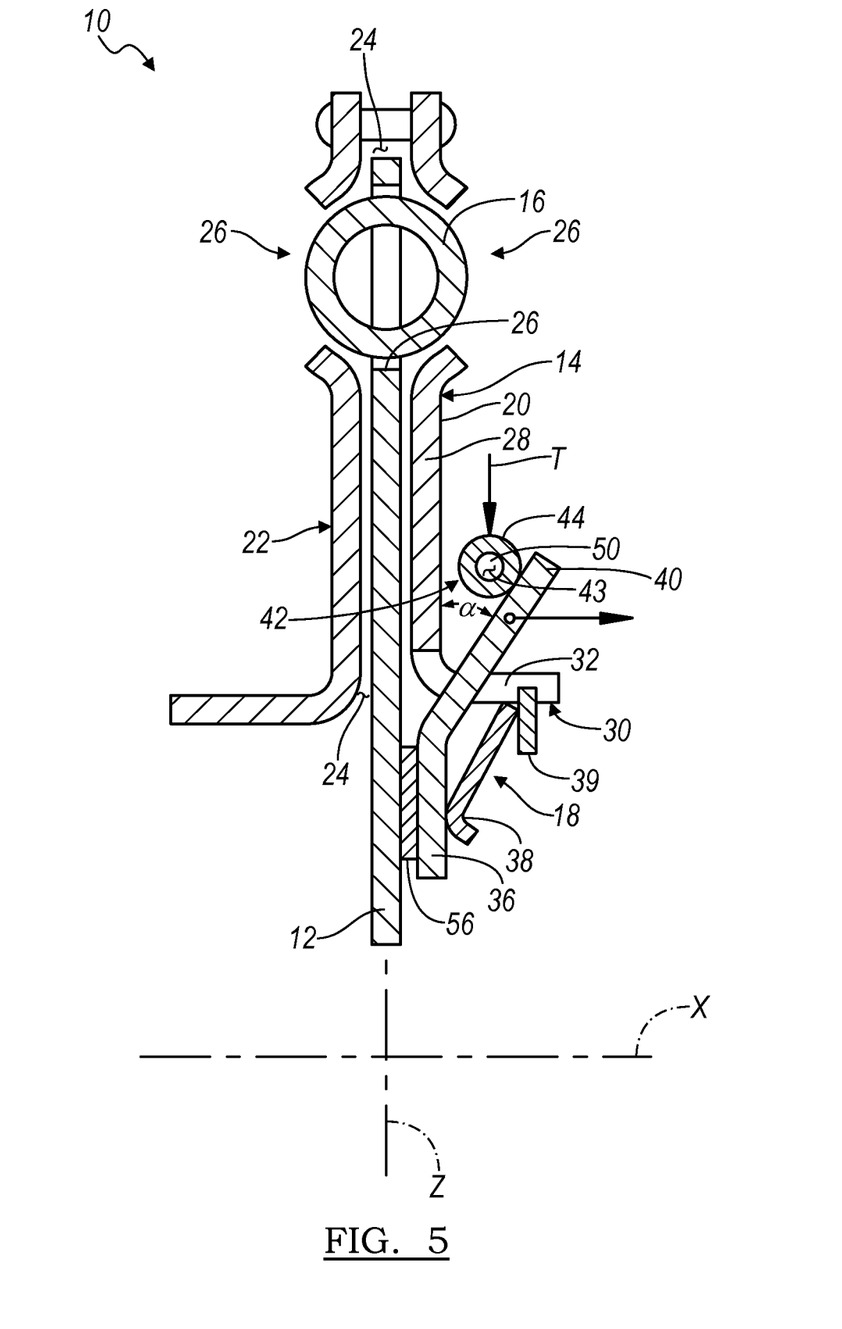
FIG. 5 is a cross-sectional view of the torsional damper assembly of FIGS. 3-4 taken along the line 5-5 of FIG. 4, in accordance with the principles of the present invention.

Now referring to FIGS. 3-5, a particular arrangement of the torsional damper assembly 10 is illustrated. The bypass clutch 18 is released by centrifugal forces. It is preferably designed such that when the engine speed reaches the opening speed O, centrifugal forces cause the bypass clutch 18 to disengage and allow the damping element or springs 16 to dampen the torque oscillations.

The output mass 14 is a cage having a first cage side 20 and an opposing second cage side 22, with a channel 24 therebetween. The input mass 12 is a drive plate sandwiched between the first and second cage sides 20, 22 of the output mass 14.

Both the input and output masses 12, 14 have cutouts 26 formed therein to hold four coil springs 16. The coil springs 16 are disposed within the cutouts 26 of both the input mass 12 and the output mass 14. The four coil springs 16 are interposed between the input and output masses 12, 14 and couple the input and output masses 12, 14 as described above with reference to FIG. 1. For example, the coil springs 16 are operable to translate torque between the input mass 12 and the output mass 14 and to dampen oscillation generated by the prime mover, wherein the rotational movement of either mass 12, 14 relative to the other mass 12, 14 creates a rotational deflection in the coil springs 16. Both the input and output masses 12, 14 have a circular shape in this embodiment and rotation on a central axis X. It should be understood that while four coil springs 16 are illustrated, fewer or more coil springs 16 could be used without falling beyond the spirit and scope of the present disclosure.

The output mass 14 includes a disc portion 28 and a hub 30 extending from the disc 28. The cutouts 26 of the output mass 14 are formed in the disc portion 28. The hub is circular in shape, and it has four raised portions 32 separated by four recesses 34 formed in the hub 30. The recesses 34 form slots through which portions of the friction plate 36 of the bypass clutch 18 extend, which will be described in further detail below. While four raised portions 32 and four recesses 34 are illustrated, fewer or more raised portions 32 and recesses 34 could be used without falling beyond the spirit and scope of the present disclosure.

The bypass clutch 18 includes a friction plate 36 and one or more clutch springs 38, which is a Belleville spring in this embodiment (see FIG. 5). The clutch springs 38 may be held in place by a retaining ring 39. The clutch springs 38 bias the friction plate 36 against the input mass 12. Therefore, when the bypass clutch 18 is engaged as shown in FIG. 5, the friction plate 36 contacts the input pass 12.

The friction plate 36 has one or more tabs 40 extending therefrom. In the illustrated embodiment, the friction plate 36 has four tabs 40, each oriented equidistant from each other around the circumference of the circular friction plate 36. Each tab 40 extends through a recess 34 of the hub 30, which holds the friction plate 36 with the output mass 14 for common rotation therewith when assembled. More particularly, the edges of the raised portions 32 block the tabs 40 from rotating with respect to the hub 30. The friction plate has friction material 56 disposed thereon, such as emery, to increase friction and prevent sliding between the friction plate 36 and the input mass 12 when the bypass clutch 18 is engaged. In some embodiments, the single friction plate 36 could be replaced by a backing plate acting on a clutch pack.

Accordingly, the bypass clutch 18 is configured to couple the input and output masses 12, 14 together for common rotation when engaged during the startup speed range S to minimize amplified vibrations and pulsations. It should be understood that in some embodiments, the startup speed range S could be any predetermined engine speed range, and it need not necessarily end at the opening speed O. Further, the startup speed range S will vary based on the particular engine or type of engine and the design parameters of the torsional damper assembly 10, including the stiffness of the springs 16. Therefore, the bypass clutch 18 may be said to engage the input and output masses 12, 14 during a first speed range, the first speed range being any desired speed range.

At least one bypass clutch release lever 42 is pivotally connected to the disc 28 of the output mass 14 via a pivot pin 52 or any other suitable means. In the alternative, the bypass clutch release lever 24 may be pivotally connected to another component. The pivot pin 52 and/or lever 42 may be inserted through a thrust bearing 53, if desired. In the embodiment illustrated, four bypass clutch release levers 42 are used (see FIG. 4; only one is shown in FIG. 3 for simplicity or as an alternative), however, it should be understood that more or fewer than four bypass clutch release levers 42 could be used, without falling beyond the spirit and scope of the present invention.

Each bypass clutch release lever 42 has a biasing member such as a roller 44 at a biasing end 50, and each clutch release lever 42 has a weighted end 46 disposed opposite the biasing end 50. The weighted end 46 is disposed farther from the pivot pin 52 than the biasing end 50 is disposed from the pivot pin 52. In other words, the pivot pin 52 is closer to the roller 44 and the biasing end 50 than to the weighted end 46. For example, the weighted end 46 could be located a first distance from the pivot pin 52, and the biasing end 50 could be located a second distance from the pivot pin 52, where the second distance is equal to about half or one-third or one-fourth the first distance. In the alternative, however, the weighted end 46 need not extend farther from the pivot pin 52 than the biasing end 50.

In one variation, the main body 48 of the lever 42 has a crescent or arcuate shape, with the roller 42 disposed at one end of the arc and the weighted end 46 disposed at the other end of the arc. The roller 44 could form a bore 43 through its center, through which the main body portion 48 extends. A retaining member (not shown) or other suitable means could be used to hold the roller 44 on the main body portion 48.

The bypass clutch release levers 42 could be integrally formed as one piece, such that mass of the lever 42 is removed from the main body portion 48 and the biasing end 50, while the mass of the lever 42 remains intact at the weighted end 46. In the alternative, the weighted end 46 could have a weight attached to it in order to make it heavier than the main body portion 48 and the biasing end 50. Still in other embodiments, the lever 42 could have a uniform thickness and weight throughout with the "weighted end" 46 still operable to react to centrifugal forces in embodiments in which the weighted end 46 extends farther from the pivot pin 52 than the roller 44 and biasing end 50.

The clutch springs 38 bias the tabs 40 of the friction plate 36 against the rollers 44. The bypass clutch release levers 42 are operable to pivotally rotate relative to the output mass 14 at the pivot pin 52. More particularly, as centrifugal forces act on the weighted end 46 of the lever 42, the weighted end 46 pivots outward away from the central rotational axis X when centrifugal forces reach a predetermined threshold. As the weighted end 46 pivots away from the central axis X, the biasing end 50 and the rollers 44 pivot toward the central axis X. When the rollers 44 move toward the central axis X, they press against the tabs 40 (see FIG. 5, where an arrow T represents the direction of travel of the roller 44 when the weighted end 46 is pivoting outward due to an increase in centrifugal forces).

In this embodiment, the bypass clutch release levers 42 are attached to a face of the output member 14 along a facial plane, which is the YZ plane as illustrated in FIG. 3. The tabs 40 extend at an acute angle α with respect to the facial plane of the output member 14, which may be any suitable acute angle; for example, the angle α could be in the range of about 20 degrees to about 60 degrees, or the angle α could be about 30 degrees or about 45 degrees. The tabs 40 form cam ramps for the rollers 44 to act upon as they travel toward the central axis X. The rollers 44 are operable to push the tabs 40 and the friction plate 36 outward and away from the drive plate or input member 12. In other words, the rollers 44 are operable to bias the bypass clutch 18 away from the input mass 12 to disengage the bypass clutch 18 when the bypass clutch release levers 42 are acted on by a predetermined magnitude of a centrifugal force.

Preferably, the bypass clutch 18 is disengaged during the damping speed range D, which begins at and is greater than the opening speed O, to permit damping by the coil springs 16, however it should be understood that the bypass clutch 18 may alternatively be disengaged in other damping speed ranges, such as those lower than the opening speed O, or that start at some point higher than the opening speed O. Therefore, it can be said that the bypass clutch is disengaged during a second speed range, wherein the second speed range can be any desired speed range.

The torsional damper assembly 10 may also include a travel limiter 54 corresponding to each bypass clutch release lever 42. The travel limiters 54 are configured to limit the travel of the weighted ends 46 of the bypass clutch release levers 42 by physically stopping the weighted ends 46 from traveling past the travel limiters 54. The travel limiters 54 could be provided in the form of raised extensions of the output member 14, as shown in FIGS. 3 and 4; however, any other suitable travel limiter could also or alternatively be used. In other embodiments, the travel limiters 54 may be omitted because the tab 40 or the raised portion 32 of the hub 30 can act as travel limiters that limit the travel of the rollers 44.

In the illustrated variation, four bypass clutch release levers 42 and four tabs 40 of the friction plate 36 are even distributed around the central rotational axis X of the torsional damper assembly 10. In the alternative, one, two, three, five, six, or more bypass clutch release levers 42 and corresponding tabs 40 could be employed, without falling beyond the spirit and scope of the present disclosure.

The torsional damper assembly 10 utilizing bypass clutch release levers 42 may be capable of high actuation force within a limited design space, relying on centrifugal forces already present by virtue of the rotation of the input mass 12 to actuate the bypass clutch release lever 42. The centrifugally actuated bypass clutch release lever 42 may eliminate the design space and cost of control system components needed for hydraulic or electrically controlled clutches.

The description of the invention is merely exemplary in nature and variations that do not depart from the gist of the invention are intended to be within the scope of the invention. Such variations are not to be regarded as a departure from the spirit and scope of the invention.

What is claimed is:

1. A torsional damper assembly for transmitting torque between a prime mover of a powertrain and an input of a transmission, the torsional damper assembly comprising:
   an input mass configured to operatively connect to the prime mover for common rotation therewith;
   an output mass configured to operatively connect to the input of the transmission for common rotation therewith;
   a damping element interposed between the input mass and the output mass, the damping element operable to translate torque between the input mass and the output mass and to dampen oscillation generated by the prime mover, wherein the damping element is configured to permit the input and output masses to rotate relative to each over a limited angular distance;
   a bypass clutch configured to couple the input and output masses together for common rotation when engaged during a first speed range to minimize amplified vibrations and pulsations caused by the prime mover, the damping element, and the input and output masses; and
   a bypass clutch release lever pivotally connected to the output mass, the bypass clutch release lever having a biasing portion and a weighted end, wherein the bypass clutch release lever is operable to pivotally rotate relative to the output mass and the biasing portion is operable to bias the bypass clutch away from the input mass to disengage the bypass clutch when the bypass clutch release lever is acted on by a predetermined magnitude of centrifugal force during a second speed range to permit damping by the damping element.

2. The torsional damper assembly of claim 1 wherein the biasing portion of the bypass clutch release lever includes a roller.

3. The torsional damper assembly of claim 2 wherein the bypass clutch includes a clutch spring and a friction plate, the friction plate assembled for common rotation with the output mass, the clutch spring configured to bias the friction plate against the input mass when the bypass clutch is engaged.

4. The torsional damper assembly of claim 1 further comprising a travel limiter configured to limit the travel of the weighted end of the bypass clutch release lever by physically stopping the weighted end from traveling past the travel limiter.

5. The torsional damper assembly of claim 1 wherein the damping element is a coil spring, wherein the input mass has portions forming an input cutout within the input mass, and wherein the output mass has portions forming an output cutout within the output mass, the coil spring being disposed in the input and output cutouts.

6. A torsional damper assembly for transmitting torque between a prime mover of a powertrain and an input of a transmission, the torsional damper assembly comprising:
   an input mass configured to operatively connect to the prime mover for common rotation therewith;
   an output mass configured to operatively connect to the input of the transmission for common rotation therewith;
   a damping element interposed between the input mass and the output mass, the damping element operable to translate torque between the input mass and the output mass and to dampen oscillation generated by the prime mover, wherein the damping element is configured to permit the input and output masses to rotate relative to each over a limited angular distance;
   a bypass clutch configured to couple the input and output masses together for common rotation when engaged during a first speed range to minimize amplified vibrations and pulsations caused by the prime mover, the damping element, and the input and output masses; and
   a bypass clutch release lever pivotally connected to the output mass, the bypass clutch release lever having a biasing portion and a weighted end, wherein the bypass clutch release lever is operable to pivotally rotate relative to the output mass and the biasing portion is operable to bias the bypass clutch away from the input mass to disengage the bypass clutch when the bypass clutch release lever is acted on by a predetermined magnitude of centrifugal force during a second speed range to permit damping by the damping element, wherein the biasing portion of the bypass clutch release lever includes a roller, wherein the bypass clutch includes a clutch spring and a friction plate, the friction plate assembled for common rotation with the output mass, the clutch spring configured to bias the friction plate against the input mass when the bypass clutch is engaged, and wherein the friction plate has a tab extending therefrom, the clutch spring biasing the tab into contact with the roller.

7. The torsional damper assembly of claim 6 wherein the bypass clutch release lever is pivotally connected to the output mass via a pivot pin.

8. The torsional damper assembly of claim 7 wherein the output mass includes a disc having a hub extending from the disc, the hub having a raised portion and a recess formed in the raised portion, the tab of the friction plate extending through the recess.

9. The torsional damper assembly of claim 7 wherein the pivot pin is located closer to the roller than to the weighted end, the bypass clutch release lever having an arcuate shape.

10. A torsional damper assembly for transmitting torque between a prime mover of a powertrain and an input of a transmission, the torsional damper assembly comprising:
an input mass configured to operatively connect to the prime mover for common rotation therewith;
an output mass configured to operatively connect to the input of the transmission for common rotation therewith;
a plurality of damping elements interposed between the input mass and the output mass, the plurality of damping elements operable to translate torque between the input mass and the output mass and to dampen oscillation generated by the prime mover;
a bypass clutch configured to couple the input and output masses together for common rotation when engaged during a first speed range to minimize amplified vibrations and pulsations; and
at least one bypass clutch release lever having a biasing portion and a weighted end, wherein the at least one bypass clutch release lever is configured to pivotally rotate relative to the output mass and the biasing portion is operable to exert a force against the biasing clutch to bias the bypass clutch away from one of the input and output masses to disengage the bypass clutch when the at least one bypass clutch release lever is acted on by a predetermined magnitude of centrifugal force during a second speed range to permit damping by the damping element.

11. The torsional damper assembly of claim 10 wherein the biasing portion of the at least one bypass clutch release lever includes a roller.

12. The torsional damper assembly of claim 11 wherein the bypass clutch includes a plurality of clutch springs and a friction plate, the friction plate assembled for common rotation with the output mass, the plurality of clutch springs configured to bias the friction plate against the input mass when the bypass clutch is engaged.

13. The torsional damper assembly of claim 10 wherein the damping elements are coil springs, the output mass having portions forming a plurality of output cutout portions in the output mass, the input mass having portions forming a plurality of input cutout portions in the input mass, each coil spring of the plurality of coil springs between disposed in both an input cutout portion of the plurality of input cutout portions and an output cutout portion of the plurality of output cutout portions.

14. The torsional damper assembly of claim 13 wherein the rotational movement of either mass relative to the other mass creates a rotational deflection in the coil springs.

15. A torsional damper assembly for transmitting torque between a prime mover of a powertrain and an input of a transmission, the torsional damper assembly comprising:
an input mass configured to operatively connect to the prime mover for common rotation therewith;
an output mass configured to operatively connect to the input of the transmission for common rotation therewith;
a plurality of damping elements interposed between the input mass and the output mass, the plurality of damping elements operable to translate torque between the input mass and the output mass and to dampen oscillation generated by the prime mover;
a bypass clutch configured to couple the input and output masses together for common rotation when engaged during a first speed range to minimize amplified vibrations and pulsations; and
at least one bypass clutch release lever having a biasing portion and a weighted end, wherein the at least one bypass clutch release lever is configured to pivotally rotate relative to the output mass and the biasing portion is operable to bias the bypass clutch away from the input mass to disengage the bypass clutch when the at least one bypass clutch release lever is acted on by a predetermined magnitude of centrifugal force during a second speed range to permit damping by the damping element, wherein the biasing portion of the at least one bypass clutch release lever includes a roller, wherein the bypass clutch includes a plurality of clutch springs and a friction plate, the friction plate assembled for common rotation with the output mass, the plurality of clutch springs configured to bias the friction plate against the input mass when the bypass clutch is engaged,
wherein the at least one bypass clutch release lever is a plurality of bypass clutch release levers having a plurality of rollers, the friction plate having a plurality of tabs extending therefrom, the clutch springs biasing the tabs into contact with the rollers.

16. The torsional damper assembly of claim 15 wherein the output mass includes a disc having a hub extending from the disc, the hub having a plurality of raised portions separated by a plurality of recesses, each tab of the plurality of tabs of the friction plate extending through a recess of the plurality of recesses.

17. The torsional damper assembly of claim 16 further comprising a plurality of travel limiters configured to limit the travel of the weighted ends of the bypass clutch release levers by physically stopping the weighted ends from traveling past the travel limiters.

18. A torsional damper assembly for transmitting torque between a prime mover of a powertrain and an input of a transmission, the torsional damper assembly comprising:
an input mass configured to operatively connect to the prime mover for common rotation therewith, the input mass forming a plurality of cutouts therein;
an output mass configured to operatively connect to the input of the transmission for common rotation therewith, the output mass comprising a disc and a hub extending from the disc, the disc forming a plurality of cutouts therein, the hub having a plurality of raised portions separated by a plurality of recesses formed in the hub;
a plurality of coil springs interposed between the input mass and the output mass, the plurality of coil springs disposed within the cutouts of the input mass and the cutouts of the disc of the output mass, the plurality of coil springs operable to translate torque between the input mass and the output mass and to dampen oscillation generated by the prime mover, wherein the rotational movement of either mass relative to the other mass creates a rotational deflection in the coil springs;

a bypass clutch configured to couple the input and output masses together for common rotation when engaged during a first speed range to minimize amplified vibrations and pulsations, the bypass clutch including a plurality of clutch springs and a friction plate, the friction plate having a plurality of tabs extending therefrom, each tab of the plurality of tabs extending through a recess of the plurality of recesses to hold the friction plate for common rotation with the output mass, the plurality of clutch springs configured to bias the friction plate against the input mass when the bypass clutch is engaged; and a plurality of bypass clutch release levers pivotally connected to the disc of the output mass, each bypass clutch release lever of the plurality of bypass clutch release levers having a biasing roller and a weighted end, the plurality of clutch springs biasing the tabs against the rollers, wherein the bypass clutch release levers are operable to pivotally rotate relative to the output mass and the rollers are operable to bias the bypass clutch away from the input mass to disengage the bypass clutch when the bypass clutch release levers are acted on by a predetermined magnitude of a centrifugal force during a second speed range to permit damping by the coil springs.

19. The torsional damper assembly of claim 18 wherein the plurality of plurality of bypass clutch release levers comprises four bypass clutch release levers, each of the four bypass clutch release levers being evenly distributed around a central rotational axis of the output mass.

20. The torsional damper assembly of claim 19 wherein the plurality of tabs comprise four tabs, the bypass clutch release levers being attached to a face of the output member along a facial plane, the tabs extending at an acute angle from the facial plane and forming cam ramps for the rollers.

* * * * *